Aug. 5, 1969      W. R. BROWN      3,459,042
FLOAT OPERATED LIQUID LEVEL TRANSMITTER
Filed May 23, 1967      2 Sheets-Sheet 1

INVENTOR
WILLIAM R. BROWN
BY
ATTORNEY

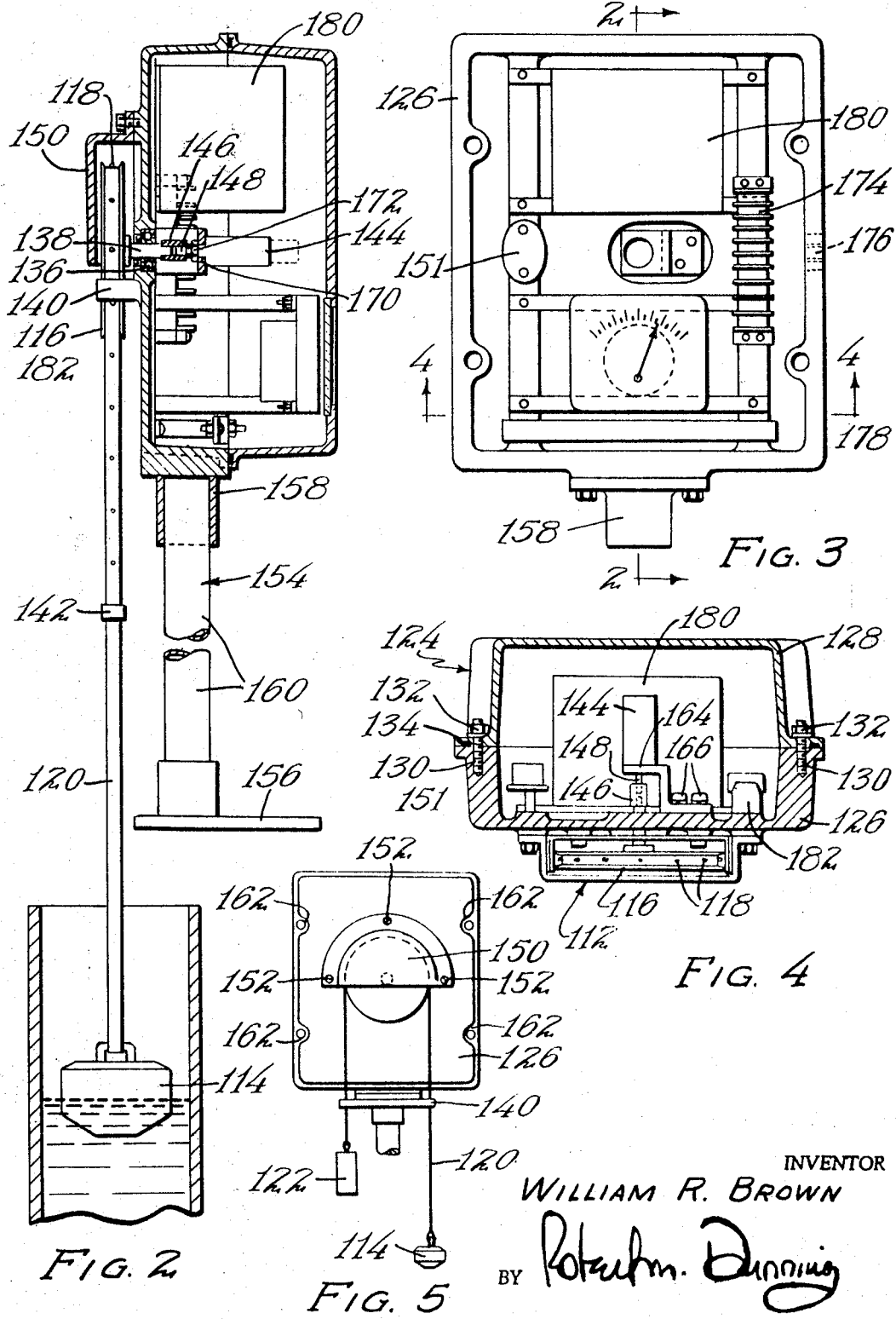

United States Patent Office 3,459,042
Patented Aug. 5, 1969

3,459,042
FLOAT OPERATED LIQUID LEVEL TRANSMITTER
William R. Brown, St. Paul, Minn., assignor, by mesne assignments, to Control Data Corporation, Minneapolis, Minn., a corporation of Delaware
Filed May 23, 1967, Ser. No. 640,726
Int. Cl. G01f 23/06
U.S. Cl. 73—313                              5 Claims

ABSTRACT OF THE DISCLOSURE

A float operated time impulse transmitter has a float operated motion to voltage transducer which actuates a multiturn potentiometer connected to plug-in circuit boards, one of which is a DC power supply and another being a voltage to time impulse converter.

SUMMARY OF THE INVENTION

This application relates to a solid state telemetering system including a sensing unit sensing changes in liquid level in including a float operated motion (level) to voltage transducer comprising a float, a flow tape, tape sheave, a float operated multiturn potentiometer and solid state, plug-in printed circuit boards. One of these solid state boards is a DC power supply and another is a voltage to time impulse converter.

The card assemblies comprise printed circuit solid state devices mounted on boards of perhaps 3 inches by 4 inches in size adapted to be plugged into a card box so as to permit ready replacement of cards in the event of a malfunction as well as to provide an exceptionally versatile system through various combinations of the card assemblies.

A sensing unit generates a signal by means of a potentiometer, the signal (input voltage) being transmitted by the sensing unit to the card circuit transmitter. The card circuit transmitter output is a series of square wave pulses (timed impulses) which are received by a receiver. The receiver in turn converts the transmitted impulses to direct current voltage proportional to the width of the pulses. Local indications of level may be provided at the transmitter or suitable gauges or meters and local alarms or controls may be provided.

It is an object of the present invention to provide a float operated primary sensing unit directly actuating a multiturn potentiometer whereby movement of the float produces a potentiometer output indicative of an infinitely variable range of level measurement. In preferred construction, the potentiometer is connected to a printed circuit card transmitter as indicated.

It is a further object of the present invention to provide a level operated solid state transmitter circuit card or board to transmit readings for remote recording and/or indication of level in tanks or reservoirs and having necessary electrical components to generate a pulse signal at predetermined intervals for a length proportional to the input signal, the circuit board preferably being a printed circuit.

It is a further object to provide a receiver circuit board to regenerate the transmission pulse signal, to convert the transmission pulse signal into direct current voltage, and to provide a receiver output signal which may be used to actuate an indicator, recorder, or other measuring device. In preferred construction, the receiver is also a printed circuit board.

The float operated primary sensor represents a radical departure from conventional units. These conventional units generally provide a pulley mounted on an output shaft, a tape overlying the wheel or pulley connected to a float, and a gear train connected to the output shaft. Float travel in these conventional units induces rotation of the pulley, a certain number of turns of the pulley through the geared mechanical reduction representing a ratio change in liquid level. As will be understood, difficulties arise in connection with the reduction gearing necessary to provide readings corresponding to the amount of flow travel. In other words, a certain number of turns of the tape wheel has to bear a mechanical ratio to a given output of the output shaft. Where a customer specifies a certain amount of travel for the float in one instance which may differ considerably from the float travel specified by another customer, obvious difficulties arise in providing the necessary gearing.

Accordingly, it is an object of the present invention to provide a solid state float operated transmitter eliminating conventional reduction gearing by providing a direct drive to a multi-turn potentiometer. Any number of turns or any fraction of a turn on the potentiometer shaft is utilized. As the setting points may be adjusted on an electronic switch by means of a trimming potentiometer to operate on any voltage level within the measuring span, pumps may be started or stopped for example, at levels or points corresponding to the voltage levels. Further, by adjusting the transmitter to correspond to the projected number of turns of the multi-turn potentiometer, as between zero (0) and the desired number of turns or fractional turn, an infinitely variable number of level measurements is available. As indicated, electronic switches may be provided and pre-set for desired levels or points of actuation.

It is a further object of the present invention to provide an electronic transmitter utilizing a printed circuit board. Further, it is an object to provide one design of printed circuit providing three types of electronic transmitters differing only in their input signal. In the present instance, the transmitter utilizes the input from a potentiometer, but copending applications describe utilization of the input from a linear voltage differential transformer and from a differential/pressure sensor.

The electronic receiver circuit board as in the case of the transmitter is preferably a printed circuit with one design being capable of accommodating three receivers, the receivers differing in their output signal. One receiver might have an output for example of 0–500 micron-amperes and be used to operate an API indicating meter, while a second receiver might have a 0–1 volt output and be used, for example, to operate a Taylor recorder, and a third receiver might have a 1–5 milliampere output and be used to operate, for example, a Hays recorder.

If electronic switches are required with receivers or when electronic switches are required with a transmitter, an isolation amplifier is necessitated. Accordingly, an object of the present invention is to provide an isolation amplifier having a high input impedance and low output impedance, the amplifier being in preferred form a printed circuit card or board. One isolation amplifier circuit board assembly may be used to drive from 1 to 6 electronic switches, and accordingly circuit board amplifier assemblies having 2, 3 or 4 isolation amplifiers may be used to drive 7–12, 13–18, and 19–24 electronic switches respectively. One isolation amplifier circuit board assembly with 0–500 micro-amperes output may be used in transmitters requiring an API meter and/or 1 to 6 electronic switches.

It is a further object of the present invention to provide a power supply in the form of printed circuit cards. The power supply is divided into three different levels of current and voltage as would be indicated from the foregoing, although obviously additional levels can be set up if desired for any reason.

An advantage of the particular invention is that except for re-calibration, no maintenance is required. In the event of a malfunction, a new card is used as a replacement. A particular advantage is that moving parts have been reduced to a minimum.

An important feature of the present invention lies in the fact that zero and span adjustments are incorporated into both the transmitter and the receiver circuitry. The zero level reading may be adjusted by means of a potentiometer, and the maximum level reading is similarly adjustable. This feature eliminates mechanical structure such as gearing to accomplish adjustment.

These and other particular objects and advantages will be more particularly described in detail when taken in conjunction with the accompanying specification and drawings.

DESCRIPTION OF THE DRAWINGS

FIGURE 2 is a side elevation of the float operated transducer coupled with a card case for printed circuit boards.

FIGURE 3 is a front elevation of the float operated transmitter.

FIGURE 4 is a section taken along the lines 4—4 of FIGURE 3.

FIGURE 5 is a reduced view illustrating the tape wheel, float, weight, and tape relationship.

DESCRIPTION OF THE INVENTION

Figure 1:
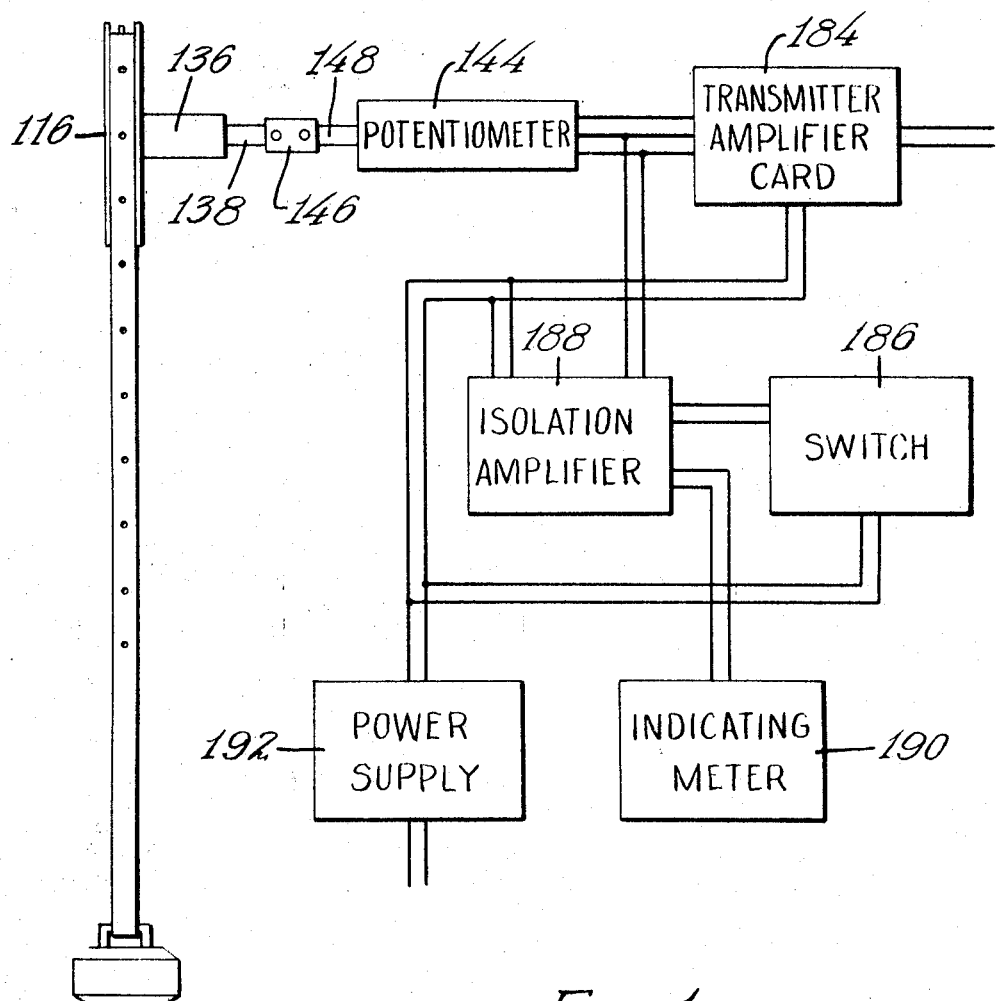
FIGURE 1 is a schematic drawing illustrating the component arrangement and circuitry of the solid state time impulse float transmitter.

For ease of description and because the float operated transducer may be used apart from as well as in combination with the printed circuit card components of the telemetering system, each will be described in sufficient detail to enable understanding by competent craftsmen of their structure and use alone and in combination.

As may be seen in FIGURE 4, the transducer 112 is a motion to voltage transducer whereby providing an indication of liquid level. The transducer comprises a primary sensor or float 114 which in preferred construction is of polystyrene plastic for water and of butyrate plastic for sewage. The float is approximately 10 inches in diameter. Obviously other float sizes and material may be utilized.

A tape sheave or wheel 116 preferably of aluminum or other non-corrosive material having tape drive pins 118 spaced around its circumference is provided. The pins 118 may be at the quadrants or more closely spaced. A tape 120 preferably of stainless steel extends over the sheave 116, the tape 120 being connected at one end to the float 114 and at the other end to a counterweight 122 of lead or other suitable material. The tape is of a length to accommodate the range through which it will extend in use. The housing 124 in which the transducer is housed is composed of sections 126 and 128 joined together by fasteners 130 such as studs each having a nut 132. A seal or gasket 134 is provided between the abutting sections to render the housing tight so as to protect the housed components from the elements.

The sheave 116 is mounted on a bearing 136 with a shaft 138 extending from the sheave 116 through the permanently greased bearing 136. A tape guide 140 adjacent the sheave provides a positive tape and sheave alignment. Limit stops 142 are provided on the tape to prevent over travel of the tape.

The other end of the sheave shaft 138 is connected to a potentiometer 144 preferably through a flexible coupling 146 and shaft 148. The potentiometer is preferably of the multi-turn type whereby any portion of the turn or turns of the potentiometer may be utilized. Essentially it is apparent that the drive to the potentiometer 144 is direct.

A shield may be provided if desired or necessitated to protect the sheave 116 as indicated at 150. This shield 150 is mounted to the housing 124 by means of screws 152 of other suitable fastening means. A thermostatically controlled protection from condensation (not illustrated) may be provided if desired. As this is a conventional device, it is not believed necessary to describe, the numeral 151 being used therefor.

The transducer 112 is mounted either as a floor mount by means of a pedestal 154 having a floor flange 156 and a post housing 158 in which a pipe column is engaged, the pipe column being numbered 160. Bosses 162 are provided through which fasteners may be directed to secure the device to a wall.

The housing 124 is preferably of aluminum or other suitable strong, non-corrosive material.

Circuit connections may be provided through the pedestal or through a tapped connection in the housing 124. As these are obvious further description is not required.

The potentiometer is mounted within the housing by means of a mounting bracket 164 and suitable fasteners extending through the bracket into the housing such as bolts 166. The shaft 148 of the potentiometer extending through the bracket 164 may extend through a bearing 170 and be secured in place by a lock nut 172.

A terminal block is indicated by the numeral 174 with a tapped connection being indicated at 176. A gauge is indicated at 178 indicating readings of feet or level.

A card case is indicated at 180, the card case being capable of holding 7 plug-in circuit boards, wires from the boards being brought to a terminal board on the bottom of the card box.

A spacer 182 is provided between the housing and the terminal block.

The operation is as follows: As the float moves with the water level, the tape 120 turns the tape wheel 116. Movement of the tape wheel is transmitted through the tape wheel shaft 138 to turn a multi-turn potentiometer 144. The potentiometer 144 is connected to the printed circuit transmitter card 184. The output of the transmitter is a series of DC pulses, each starting 90 milliseconds after the start of the preceding pulse. The width of the pulse will be from 15 to 75 milliseconds long and proportional to the position of the potentiometer 144.

If switches 186 are desired for local control or alarm circuits, the output of the potentiometer 144 is fed through an isolation amplifier 188 to the electronic switch units 186. This is done in order to prevent non-linearity due to potentiometer loading.

The electronic switch 186 operates a relay (not illustrated) at a predetermined voltage.

The isolation amplifier may be used to drive an indicating meter 190 in addition to the switch 186 in certain instances.

All units operate on DC which is supplied by the power supply 192.

From the foregoing it will be apparent that the circuit card assemblies, preferably 3 inch by 4 inch printed circuit cards provide an unusual adaptability of the transducers. While the transducers are operably apart from the transmitting circuit cards, nevertheless their advantage is apparent.

The printed circuit cards are solid state devices. In the present invention the card uses a potentiometer input. A card type receiver would accordingly be designed for a 0–500 micro-amperes output and be used to operate an API indicating meter.

The power supply 192 is a solid state plug-in board requiring 120 volts, 50 or 60 cycle input. The power supply provides DC voltage to motion (level) transducer to change the mechanical motion into the voltage signal. The voltage signal from the power supply is accepted by a solid state, plug-in board which converts the voltage signal into a time impulse (pulse duration) signal. This signal is on a 90 millisecond (.09 second) repeat cycle. The pulse width (on time) is 15 milliseconds (0) 275 milliseconds (maximum). The width of pulse is proportional to the liquid level.

Indicating meters may be connected to the system as required. Where alarm or control switches are provided, these are always provided in pairs. Two switches are provided. Each switch is fully adjustable over the entire response range. Where an indicator is provided, 8 switches are available, whereas 22 switches are available when an indicator is not provided.

For protection from condensation, thermostatically controlled heating tapes may be utilized.

In transmission, the total loop resistance should not exceed 2500 ohms. This is the equivalent of approximately 30 miles of No. 19 wire. Capacitance and inductance will not affect transmission over such distance.

Reviewing the operation, the float follows the level of the water, the tape attached to the float turning the tape wheel. Movement of the tape wheel rotates the wheel shaft to turn the potentiometer which is wired to the transmitter. The transmitter puts out a series of DC pulses, each of the pulses starting 90 milliseconds after the preceding pulse, the width of each pulse being from 15 to 75 milliseconds long and proportional to the position of the potentiometer. As previously indicated, switches may be provided for local control or alarm circuits, the output of the potentiometer being fed through an isolation amplifier to prevent non-linearity due to potentiometer loading, the feeding through the isolation amplifier being fed to the electronic switch units. The electronic switch units are designed to operate a relay at a predetermined voltage. Should the voltage from the isolated amplifier be at or above the preset voltage, the relay will close. For operation on falling level, the normally closed circuit on the relay is used. One direct current power supply operates all of the units.

The mechanical structure is simplified by the provision of trimming potentiometers for adjusting the zero reading and for adjusting the span. Thus the zero and maximum level readings are completely adjustable.

In accordance with the patent office statutes, I have described the principles of construction and operation of my Float Operated Liquid Level Transmitter, and while I have endeavored to set forth the best embodiment thereof, I desire to have it understood that changes may be made without departing from the spirit of my invention.

I claim:
1. A liquid level solid state telemetering device adapted for transmitting timed pulses to a remote receiver depending upon liquid level in a reservoir or tank, and the like, the system including:
   a float adapted to rest on the surface of liquid for movement up and down in relation to the level of liquid,
   a wheel displaced vertically from said float,
   a tape connecting said wheel and float and imparting rotary movement to said wheel upon vertical movement of said float,
   a shaft rotatable with said wheel,
   a multi-turn potentiometer coupled to said shaft for rotation thereby,
   a power supply connected to said potentiometer to provide a current thereto which is varied by said potentiometer proportionally to the liquid level as determined by said float, and
   a solid state transmitter connected to said potentiometer to produce timed pulses variable in width in proportion to the voltage supplied by said potentiometer, said transmitter accordingly transmitting a pulse signal which varies in accordance with the variations in the liquid level.

2. The structure of claim 1 and including a solid isolation amplifier connected to said transmitter to supply electronic switch voltage proportional to the width of said pulses, and an electronic switch connected to said isolation amplifier for actuation thereby.

3. The device described in claim 1 and in which said transmitter and power supply are printed circuit card assemblies.

4. The structure of claim 2 and in which said power supply, transmitter, isolation amplifier and electronic switch are printed circuit card assemblies.

5. The structure of claim 1 and in which means are provided for preventing relative rotation between said tape and said wheel, and in which said float is connected to one end of said tape and a counterbalance means is connected to the other end thereof.

References Cited

UNITED STATES PATENTS

| | | | |
|---|---|---|---|
| 2,207,769 | 7/1940 | White | 73—313 XR |
| 2,736,008 | 2/1956 | Miller | 73—313 XR |
| 3,182,457 | 5/1965 | Sato et al. | 340—244 XR |
| 3,237,449 | 3/1966 | Brandt | 73—398 XR |
| 3,286,528 | 11/1966 | Jullien-Davin | 73—398 |

LOUIS R. PRINCE, Primary Examiner

D. O. WOODIEL, Assistant Examiner

U.S. Cl. X.R.

73—321